(12) United States Patent
Soliman et al.

(10) Patent No.: US 10,273,354 B2
(45) Date of Patent: Apr. 30, 2019

(54) REINFORCED THERMOPLASTIC POLYMER COMPOSITION

(71) Applicant: SABIC Global Technologies B.V., Bergen op Zoom (NL)

(72) Inventors: Maria Soliman, Geleen (NL); Ronald Julianus Peter Schipper, Geleen (NL); Leonardus Joore, Geleen (NL); Ajay Kumar Taraiya, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 157 days.

(21) Appl. No.: 15/321,093

(22) PCT Filed: Jun. 23, 2015

(86) PCT No.: PCT/EP2015/064082
§ 371 (c)(1),
(2) Date: Dec. 21, 2016

(87) PCT Pub. No.: WO2016/001012
PCT Pub. Date: Jan. 7, 2016

(65) Prior Publication Data
US 2017/0137616 A1    May 18, 2017

(30) Foreign Application Priority Data
Jun. 30, 2014   (EP) .................................... 14174995

(51) Int. Cl.
*C08L 1/00*   (2006.01)
*C08L 23/12*   (2006.01)
*C08J 3/00*   (2006.01)

(52) U.S. Cl.
CPC .............. *C08L 23/12* (2013.01); *C08J 3/005* (2013.01); *C08J 2323/12* (2013.01); *C08J 2401/02* (2013.01); *C08J 2423/12* (2013.01); *C08L 2205/03* (2013.01); *C08L 2205/16* (2013.01)

(58) Field of Classification Search
CPC .. C08L 23/12; C08L 2205/16; C08L 2205/03; C08J 3/005; C08J 2323/12; C08J 2401/02; C08J 2423/12
USPC .......................................................... 524/35
See application file for complete search history.

(56) References Cited

U.S. PATENT DOCUMENTS

| 5,173,154 A | 12/1992 | Heinrich |
| 2002/0142114 A1* | 10/2002 | Mizuno .................... B27N 5/00 |
| | | 428/34.3 |
| 2010/0190891 A1 | 7/2010 | Eichinger et al. |

FOREIGN PATENT DOCUMENTS

| CA | 802720 A | 12/1968 |
| EP | 1398279 A2 | 3/2004 |
| EP | 1990362 A1 | 11/2008 |
| JP | 05269736 A | 10/1993 |
| JP | 0680832 A | 3/1994 |
| JP | 200043037 A | 2/2000 |

OTHER PUBLICATIONS

Felix et al., Journal of Applied Polymer Science, vol. 42, 609-620, 1991.*
Myers et at., Proceedings of the 1992 annual conference of the Society of Plastics Engineer, 602-604, 1992.*
Bengtsson et al., "Extrusion and Mechanical Properties of Highle Filled Cellulose Fibre-Polypropylene Composites," Science Direct; Jul. 18, 2007, pp. 1922-1931, vol. 38 No. 8.
Clemons et al., "Dynamic Fracture Toughness of Polypropylene Reinforced With Cellulose Fiber," Jun. 1, 1997; pp. 1012-1018. vol. 37, No. 6.
Clemons et al., "Waste-Newspaper-Polypropylene Thermoplastic Composites: Research- and Plant-Scale Studies of Commercial Feasibility," Wastepaper V; Proceedings, Chicago Mar. 27-30, 1994, pp. 1-20.
Clemons et al., "Effects of Composition and Polypropylene Melt Flow on Polypropylene—Waste Newspaper Composites," Society of Plastics Engineers; 1992, pp. 602-604, vol. 1.
Felix et al., "The Nature of Adhesion in Composites of Modified Cellulose Fibers and Polypropylene", Journal of Applied Polymer Science; pp. 609-620, vol. 42, No. 3.
Ganster et al., "High-Tenacity Man-Made Celluluse Fibre Reinforced Thermoplastics," Science Direct; pp. 1796-1804, vol. 37, No. 10.
International Search Report; International Application No. PCT/EP2015/064082; International Filing Date: Jun. 23, 2015; dated Dec. 17, 2015 ; 5 Pages.
Written Opinion of the International Searching Authority; International Application No. PCT/EP2015/064082; International Filing Date: Jun. 23, 2015; dated Dec. 17, 2015; 9 Pages.

* cited by examiner

*Primary Examiner* — Hui H Chin
(74) *Attorney, Agent, or Firm* — Cantor Colburn LLP

(57) ABSTRACT

The present invention relates to a process for making a thermoplastic composition, comprising the steps of: a) melt mixing a first thermoplastic polymer and a paper product comprising a mixture of cellulose fibers and a second thermoplastic polymer.

15 Claims, No Drawings

REINFORCED THERMOPLASTIC POLYMER COMPOSITION

CROSS REFERENCE TO RELATED APPLICATIONS

This application is a 371 of International Application No. PCT/EP2015/064082, filed Jun. 23, 2015, which claims priority to European Patent Application No. 1417995.2, filed Jun. 30, 2014, both of which are incorporated by reference in their entirety herein.

The present invention relates to a thermoplastic polymer composition comprising a thermoplastic polymer and cellulose fibers.

Wastepaper is a major source of solid waste. Much of these wastes are still landfilled. Use of wastepaper as a resource for producing new papers or other articles has been investigated.

One known use of this resource is the use as a reinforcing filler in a thermoplastic composition. Society of Plastics Engineers; 1992: 602-604. Vol. 1 "Effects of Composition and Polypropylene Melt Flow on Polypropylene-Waste Newspaper Composites" describes polypropylene-waste newspaper composites. In this article, the properties of PP composites filled with 42% of old newspaper fibers were compared with those of the unfilled PP composites. The old newspaper fibers were from a newspaper which was hammermilled to approximately 15-0 mm flakes. The newspaper flakes were mixed with a maleated polypropylene in a mixer before polypropylene was added. An increase in tensile modulus and tensile strength was observed. The addition of the old newspaper fibers however resulted in a drastic reduction of the unnotched impact energy. A thermoplastic polymer composition having better mechanical properties is desirable.

It is an object of the present invention to provide a thermoplastic polymer composition reinforced by cellulose fibers, in which above-mentioned and/or other problems are solved.

Accordingly, the present invention provides a process for making a thermoplastic composition, comprising the step of:

a) melt mixing a first thermoplastic polymer and a paper product comprising a mixture of cellulose fibers and a second thermoplastic polymer.

The invention is based on the finding that papers for a pad or a bag for beverages, such as coffee pad papers and tea bag papers, have surprisingly higher reinforcing effects than other types of (waste) papers. Although not wishing to be bound by theory, the inventors believe that the presence of a thermoplastic polymer in the coffee pad papers or tea bag papers leads to a good dispersion of the fibers in the thermoplastic to be reinforced, which in turn leads to the good mechanical properties. The thermoplastic polymer in the coffee pad paper or tea bag paper melts during the melt mixing and loosens the cellulose fibers in the paper, disintegrating the paper. The loosened cellulose fibers easily disperse in the thermoplastic polymer to be reinforced.

The term "mixture of cellulose fibers and a second thermoplastic polymer" is herein understood that the second thermoplastic polymer is distributed in the paper product between the cellulose fibers, i.e., the second thermoplastic polymer is present in the bulk of the paper product. The second thermoplastic polymer may also be present between the fibers at the surface of the paper product. It is to be understood that a thermoplastic polymer provided on the surface of the paper product as a coating is not considered as part of a "mixture of cellulose fibers and a second thermoplastic polymer".

Papers are generally formed from a pulp of cellulose fibers which is spread in a sheet on a substrate to dry. During the drying, the cellulose fibers stick together to form a paper having an open structure with pores between the cellulose fibers. Accordingly, the paper product used in the present invention may have a porous structure of the cellulose fibers wherein the second thermoplastic polymer partly or wholly covers the cellulose fibers. In this case, the second thermoplastic polymer typically has an undefined shape.

Preferably, the paper product is obtained by a process comprising i) providing a mixture of the cellulose fibers and a melt of the second thermoplastic polymer and ii) cooling the mixture to a temperature below the melting point of the second thermoplastic polymer. This allows an easy control of the ratio between the cellulose fibers and the second thermoplastic polymer and a high amount of the second thermoplastic polymer to be chosen if desired. Papers for a pad or a bag for beverages are made by such a process.

In Felix J M et al, "The nature of adhesion in composites of modified cellulose fibers and polypropylene", Journal of applied polymer science, vol. 42, no. 3, p. 609-620, cellulose fibers were surface modified with polypropylene-maleic anhydride copolymer. The modified fibers were compounded with polypropylene, and composites were manufactured by injection molding. The surface modification of the cellulose fibers was performed by immersing the cellulose fibers in a solution of polypropylene-maleic anhydride copolymer in hot toluene. The concentration of copolymer in solution was 5 wt % of the fibers. The fibers were Sohxlet-extracted with toluene and dried. In this document, the surface modified cellulose fibers were not obtained by melting the polypropylene-maleic anhydride copolymer.

Step i) may involve melting the second thermoplastic polymer and subsequently mixing the cellulose fibers with the melted second thermoplastic polymer. Preferably, however, step i) involves dry blending the cellulose fibers and the second thermoplastic polymer and melting the second thermoplastic polymer optionally while mixing. This leads to a more homogeneous mixture.

Preferably, the second thermoplastic polymer to be dry blended with the cellulose fibers is in the form of fibers. The differences in density and shape of components to be blended tend to lead to an uneven distribution of different components. When the second thermoplastic polymer also has the form of fibers, a homogeneous mixture of the cellulose fibers and the second thermoplastic polymer is obtained.

Alternatively, the second thermoplastic polymer may have a fiber shape and the paper product used in the present invention may have a porous structure of the cellulose fibers and fibers of the second thermoplastic polymer.

The production of such paper products is well known and an example of such paper product is called a heat sealable filter paper.

Accordingly, in preferred embodiments, the paper product is obtained by a process comprising i) providing a mixture of the cellulose fibers and a melt of the second thermoplastic polymer and ii) cooling the mixture to a temperature below the melting point of the second thermoplastic polymer, or the paper product has a porous structure of the cellulose fibers and fibers of the second thermoplastic polymer.

U.S. Pat. No. 5,173,154 describes an example of a paper product having a porous structure of cellulose fibers wherein the second thermoplastic polymer partly or wholly covers the cellulose fibers. U.S. Pat. No. 5,173,154 discloses a heat sealable tea bag paper in which the first phase of natural fibers is penetrated by the second phase of synthetic fibers, in such a way that both sides of the paper are heat-sealable. In the production step, the phases penetrating each other are dried and thereby heated in such a manner that the synthetic fibers melt and, upon solidification, wrap around the natural fibers so that these fibers are enclosed or covered at least partially. As the suitable synthetic fiber, polyethylene, polypropylene, or a copolymer of vinyl chloride and vinyl acetate are mentioned.

Preferably, the paper product used in the process according to the invention is a filter paper, e.g. a coffee pad paper or a tea bag paper. The "coffee pad" is also sometimes called "coffee pod", "coffee pouch" or "coffee bag". They are understood to mean the same product and is a (usually single-use) package of a filter paper which contain ground coffee beans. These types of paper products have a porous structure of the cellulose fibers and the second thermoplastic polymer partly or wholly covers the cellulose fibers forming the porous structure.

CA802720 describes an example of a paper product having a porous structure of cellulose fibers and fibers made of a thermoplastic polymer.

Preferably, the paper product used in the present invention is an industrial waste from a process for making a pad or a bag for beverages, such as a coffee pad or a tea bag. In the process for making a pad or a bag for beverages the coffee pad or tea bag is typically cut out to shape from a sheet of a paper product comprising a mixture of cellulose fibers and a thermoplastic polymer. The remaining of the paper product is typically discarded. According to the present invention, the unusable remains of the paper product can advantageously be used as the source material for making the polymer composition according to the present invention.

The paper product used in the present invention may further comprise a coating of a thermoplastic polymer on one or both sides of the paper product. It will be appreciated that the coating is provided in such a way that the filtering capability is maintained if the paper product is a filter paper such as a coffee pad paper or a tea bag paper.

The paper product used in the present invention may further be provided as part of an assembly of the paper product and a further element such as a plastic frame. An example of such an assembly is a beverage pad comprising a plastic frame and the paper product as described in the present application. An example of such an assembly is described e.g. in EP1398279.

Preferably, the melting point of the first thermoplastic polymer is equal to or higher than the melting point of the second thermoplastic polymer. This ensures that the melting of the first thermoplastic polymer also melts the second thermoplastic polymer. The temperature of the melt mixing step in the process according to the present invention can then be chosen according to the normal temperature for the melt mixing of first thermoplastic polymer, which is the polymer to be reinforced.

Preferably, the first thermoplastic polymer has the highest melting point among the thermoplastic polymers in the melt mixture such as the thermoplastic polymer in any coating of the paper product or any plastic frame.

The first thermoplastic polymer may in principle be any thermoplastic polymer for which reinforcement is desirable. Examples of the first thermoplastic polymer include polyamides, such as polyamide 6, polyamide 66, or polyamide 46; polyolefins such as polypropylenes and polyethylenes; polyesters, such as polyethylene terephthalate and polybutylene terephthalate; polycarbonates; polyphenylene sulphide; polyurethanes; including blends and copolymers thereof. Preferably, the first thermoplastic polymer is a polyolefin. Examples of suitable polyolefins are polypropylene; polyethylene (e.g. high density polyethylene (HDPE), low density polyethylene (LDPE), linear low density polyethylene (LLDPE), metallocene-catalyzed polyethylene, very low density polyethylene (VLDPE), ultrahigh molecular weight polyethylene (UHMWPE), high performance polyethylene (HPPE)); copolymers of ethylene and propylene; copolymers derived from ethylene or propylene and at least one monomer chosen from methyl acrylate, ethyl acrylate, n-butyl acrylate, methyl methacrylate, acrylic acid, methacrylic acid and carbon monoxide; and copolymers of olefins with a diolefin, such as a copolymer of ethylene, or of propylene, or of ethylene and other olefins, with: linear aliphatic nonconjugated dienes of at least six carbon atoms (such as 1,4-hexadiene) and other dienes, conjugated or not, such as norbornadiene, dicyclopentadiene, ethylidene norbornene, butadiene, and the like. The first thermoplastic polymer may be a combination of two or more of the thermoplastic polymer mentioned above.

Examples of suitable second thermoplastic polymer are the same as the examples of suitable first thermoplastic polymer.

The first thermoplastic polymer and the second thermoplastic polymer may be of the same type or different type. The first thermoplastic polymer and the second thermoplastic polymer are chosen to be compatible with each other. Suitable combinations of compatible polymers are known to the skilled person and examples include polyolefin-polyolefin and polyolefin-polyester.

In some preferred embodiments, the first thermoplastic polymer is polyolefin and the second thermoplastic polymer is polyolefin.

In some preferred embodiments, the first thermoplastic polymer is polypropylene and the second thermoplastic polymer is polypropylene.

In some preferred embodiments, the first thermoplastic polymer is polypropylene and the second thermoplastic polymer is polyethylene.

In some preferred embodiments, the first thermoplastic polymer is polypropylene and the second thermoplastic polymer is a mixture of HDPE and LLDPE.

In some preferred embodiments, the first thermoplastic polymer s polypropylene and the second thermoplastic polymer is a mixture of HDPE and LDPE.

Preferably, the cellulose fibers are natural cellulose fibers, such as normally used in the paper industry.

Conventional additives may also be added to the first thermoplastic polymer and the paper product, e.g. a coupling agent; UV stabilisers; anti-oxidants; heat stabilisers; colorants, like pigments and dyes; clarifiers; surface tension modifiers; smell reducers; lubricants; surface modifiers; flame retardants; mould-release agents; flow improving agents; plasticizers; antistatic agents; blowing agents; external elastomeric impact modifiers such as ethylene-octene copolymer (commercially available as Engage (R)), plastomer and softener. The coupling agent may e.g. be maleated polypropylene. The skilled person can readily select any suitable combination of additives and additive amounts without undue experimentation. The amount of the additives depends on their type and function and typically is of from 0 to about 30 wt %. The amount of the additives may e.g. be from about 1 to about 20 wt %; from about 2 to about 10 wt % or of from 3 to about 5 wt % based on the total composition.

Additional fillers may also be added to the first thermoplastic polymer and the paper product. Suitable fillers include talc, calcium carbonate, barium sulphate, clays, nanoclays, carbon black, various forms of silica (precipitated or hydrated, fumed or pyrogenic, vitreous, fused or colloidal, including common sand), glass, metals, inorganic oxides. Fillers may be of any form, e.g. sphere, plate, acicular, flake, fiber or whisker. Suitable fibrous fillers include glass fibers such as short glass fibers and long glass fibers used e.g. in SABIC Stamax polypropylene grade, basalt fibers, aramid fibers, carbon fibers, carbon nanofibers, carbon nanotubes, carbon buckyballs, ultra high molecular weight polyethylene fibers, melamine fibers, polyamide fibers, metal fibers, natural fibers, potassium titanate whiskers, and aluminum borate whiskers.

The paper product may be used in the process of the invention as part of an assembly of the paper product and a further element such as a plastic frame.

Preferably, the total of the first thermoplastic polymer and the paper product is 90-100 wt % of the total of the melt mixture.

The amount of the paper product mixed with the first thermoplastic polymer may be selected according to the desired amount of the cellulose fibers in the final thermoplastic composition. Preferably, the amount of the cellulose fibers in the thermoplastic composition is 1-50 wt %, more preferably 5-40 wt %, more preferably 10-30 wt %, of the total composition.

The weight ratio between the first thermoplastic polymer and the paper product to be mixed in step a) may e.g. be 98:2 to 30:70, 90:10 to 40:60 or 80:20 to 50:50.

The paper product may comprise e.g. 0-20 wt % or 1-10 wt % of other substances such as fillers and/or ink.

The paper product may comprise a further thermoplastic polymer which is predominantly present on one or both surfaces of the paper product.

Preferably, the total of the cellulose fibers and the second thermoplastic polymer is 90-100 wt % of the total of the paper product.

Preferably, the paper product comprises 50-99% of the cellulose fibers and 1-50% of the second thermoplastic polymer. More preferably, the paper product comprises 60-95 wt % of the cellulose fibers and 5-40 wt % of the second thermoplastic polymer. More preferably, the paper product comprises 60-90 wt % of the cellulose fibers and 10-40 wt % of the second thermoplastic polymer. Preferably, the paper product comprises 50-99% of the cellulose fibers and 1-50% of the second thermoplastic polymer, wherein the total of the cellulose fibers and the second thermoplastic polymer is 90-100 wt % of the total of the paper product.

In particularly preferred embodiments, the paper product comprises 60-95 wt % of the cellulose fibers and 5-40 wt % of the second thermoplastic polymer and the amount of the cellulose fibers in the thermoplastic composition is 5-15 wt % of the total composition.

In particularly preferred embodiments, the paper product comprises 60-95 wt % of the cellulose fibers and 5-40 wt % of polypropylene and the amount of the cellulose fibers in the thermoplastic composition is 5-15 wt % of the total composition.

In particularly preferred embodiments, the paper product comprises 60-90 wt % of the cellulose fibers and 10-40 wt % of the second thermoplastic polymer and the amount of the cellulose fibers in the thermoplastic composition is 5-15 wt % of the total composition.

In particularly preferred embodiments, the paper product comprises 60-90 wt % of the cellulose fibers and 10-40 wt % of polypropylene and the amount of the cellulose fibers in the thermoplastic composition is 5-15 wt % of the total composition.

The thermoplastic polymer composition may be obtained according to the process of the invention by melt mixing a first thermoplastic polymer and a paper product. The melt mixing is preferably done in an extruder, but may also be done in a mixer without an extrusion function. In the cases where the melt mixing is done in an extruder, the melt mixture is extruded from the extruder. In the cases where the melt mixing is done in a mixer without an extrusion function, the melt mixture is transferred to (e.g. poured into) a mould having a desired shape to obtain a solid composition having a desired shape.

In the cases where the melt mixing is done in an extruder, the thermoplastic composition of the invention is preferably made in a form that allows easy processing into a shaped article in a subsequent step, like in pellet or granular form. The obtained pellets may further be melted and moulded into an article of a desired shape. Alternatively, the extrusion from the extruder may involve directly moulding the obtained melted mixture into a moulded article having a desired shape. Accordingly, in preferred embodiments of the process of the invention, step a) is done in an extruder and the process further comprises the step b) extruding the melt mixture from the extruder and moulding the melt mixture to obtain a moulded article.

Suitable examples of moulding processes include injection moulding, compression moulding, extrusion moulding, extrusion compression moulding, profile extrusion, thermoforming, casting and blow moulding. Injection moulding is widely used to produce articles such as automotive exterior parts like bumpers, automotive interior parts like instrument panels, or automotive parts under the bonnet. Extrusion moulding is widely used to produce articles such rods, sheets and pipes.

After moulding, the article is cooled in the mould, removed from the mould and optionally finished. Finishing the article can, for instance, be performed by removing excess material attached to the moulded article via cutting, breaking, grinding or tumbling.

Step a) is performed at a temperature above the melting points of the first and the second thermoplastic polymers. The temperature is chosen to a temperature which does not degrade the cellulose fibers in the paper product. In the cases where the first thermoplastic polymer is a propylene homo- or co-polymer, step a) is preferably performed at 150-250° C.

Melt mixing of the first thermoplastic polymer and the paper product can be performed in a commonly used extruder. Many types of extruders are well-known. The extruder may e.g. be single or twin screw extruder.

The first thermoplastic polymer may be added to the extruder in any known form, most typically in the form of pellets.

The paper product may also be added to the extruder in any known form such as pellets made by milling and compacting the paper product. Converting the paper product into pellets can be done in any known manner. For example, the paper product may be pelletized without use of water or other additives. Alternatively, the paper product may be pelletized using water and/or other conventional additives for pelletizing. The compacting ratio, i.e. the ratio of the length and diameter of the die opening, may e.g. be 1-10. Preferably, the compact ratio is 1.5-8, more preferably 2-6, more preferably 3-5, more preferably 3.5-4.5. This achieves pellets with appropriate size reduction while allowing good melt-mixing with the first thermoplastic polymer. The use of pellets allows use of thick paper products for the process of the invention, which may not be suitable for directly feeding by a side feeder in the form of a paper. It is also possible to add the paper product after milling without compaction.

The paper product may also be added to the extruder in the form of a paper in a non-pelletized form. Addition of the paper product in the form of a paper is highly advantageously in that no pretreatment of the paper product is needed for feeding the paper product to the extruder in the process of the present invention. The paper product may be a roll of paper which is fed to the extruder e.g. from a side feeder. The screw in the extruder automatically pulls a controlled amount of the paper into the extruder during the process according to the invention.

Accordingly, in some preferred embodiments, step a) involves melting the first thermoplastic polymer in the extruder and feeding the paper product to the melted first thermoplastic polymer from a side feeder of the extruder.

Compositions and Articles

The present invention further provides a thermoplastic polymer composition obtainable by the process according to the present invention.

The present invention further provides a thermoplastic polymer composition comprising 85-95 wt % of polypropylene, 5-15 wt % of cellulose fibers, wherein the thermoplastic polymer composition has a density of 925-975 kg/m$^3$ and at least one of a tensile modulus of at least 2500 N/mm2 as determined by ISO 527/1A at 23° C. and a tensile strength of at least 4242 N/mm$^2$, more preferably at least 45 N/mm$^2$, as determined by ISO 527/1A at 23° C.

The thermoplastic polymer composition according to the invention may be in the form of pellets. The thermoplastic polymer composition may be obtained in the form of pellets by extruding the melt mixture through a die to form a strand, cooling the strand and cutting the cooled strand into pellets.

The present invention further provides a moulded article comprising the thermoplastic composition according to the present invention.

The present invention further provides articles manufactured from the polymer composition obtainable by the process according to the invention. Such articles may be automotive articles, such as instrument panel carriers, bumper fascia, door panels, under bonnet applications, body panels, mid consoles, pillar, trim.

However such articles may also be (parts of) domestic appliances such as vacuum cleaners, coffee makers, washing machines, wash dryers and the like. In yet another category of application, the articles may be kitchen appliances such as cutlery, plates, cups, cutting plates and the like.

The present invention further provides use of a paper product comprising a mixture of cellulose fibers and a second thermoplastic polymer for reinforcing a thermoplastic composition comprising a first thermoplastic polymer.

The present invention further provides a moulding composition comprising a first thermoplastic polymer and a paper product comprising a mixture of cellulose fibers and a second thermoplastic polymer. The term "moulding composition" is herein understood as a composition to be melt mixed according to the process of the invention and moulded into a desired shape.

The first thermoplastic polymer may be in a particulate form such as powder or pellets. The paper product may be in the form of pellets or flakes. The moulding composition may be a dry mixture of the first thermoplastic polymer and the paper product. The moulding composition may also be provided as the first thermoplastic polymer in a first container and the paper product in a second container different from the first container.

The moulding composition may be made into pellets by extruding the melt mixture through a die to form a strand, cooling the strand and cutting the cooled strand into pellets.

Although the invention has been described in detail for purposes of illustration, it is understood that such detail is solely for that purpose and variations can be made therein by those skilled in the art without departing from the spirit and scope of the invention as defined in the claims.

It is further noted that the invention relates to all possible combinations of features described herein, preferred in particular are those combinations of features that are present in the claims.

It is further noted that the term 'comprising' does not exclude the presence of other elements. However, it is also to be understood that a description on a product comprising certain components also discloses a product consisting of these components. Similarly, it is also to be understood that a description on a process comprising certain steps also discloses a process consisting of these steps.

The invention is now elucidated by way of the following examples, without however being limited thereto.

EXAMPLES

Example 1

Polypropylene (PP579S from Saudi Basic Industries Corporation), a roll of a paper product, 2 wt % of a coupling agent (maleic anhydride modified polypropylene) and 0.3% of Irganox B225 (processing and long-term thermal stabilizer) were melt mixed in an extruder to obtain a polypropylene composition. The roll of the paper product was fed from the side feeder of the extruder. The composition was extruded from the extruder and formed into pellets.

The paper product was a coffee padpaper comprising 70-75 wt % of cellulose fibers and 25-30 wt % of polypropylene homopolymer as determined by differential scanning calorimetry (DSC).

The amount of the cellulose fibers in the final composition was determined by DSC. 5-10 g (about 500 granules) of pellets were cryogenically milled into powder using nitrogen for cooling and part of the powder was used for the DSC (Perkin Elmer 0 to 200° C. at 10° C./min). This was done in order to determine the average content of the cellulose fibers in a pellet.

The extruder was a Berstorff ZE25 twin screw extruder having a length/diameter ratio of 48 and 2 side feeders.

Example 2

Example 1 was repeated except that the extruder used was a Berstorff ZE25 twin screw extruder having a length/diameter ratio of 36 and 1 side feeder.

Comparative Experiment A

Example 2 was repeated except that no filler was added.

Comparative Experiment B

Example 1 was repeated except that the paper product was a toilet paper comprising less than 1 wt % of filler as determined by the ash content measurement and undetectable amount of polymer.

Comparative Experiments C-E

Example 2 was repeated except that talc (commercially available talc HM4) was added as the filler instead of the paper product. The amount of talc in the final composition was determined by the ash content.

Various mechanical properties of the obtained propylene composition were measured as follows:

The density of the polypropylene composition was determined according to ISO 1183 at 23° C.

The tensile modulus was determined according to ISO 527/1A at 23° C.

The tensile strength was determined according to ISO 527/1A at 23° C.

The flexural modulus was determined according to ASTM D790 at 23° C. in parallel orientation and perpendicular orientation to the flow of the composition for making the test specimen.

The flexural strength was determined according to ASTM D790 at 23° C. in parallel orientation and perpendicular orientation to the flow of the composition for making the test specimen.

The charpy impact strength was determined according to ISO 179/1eU (unnotched) and ISO 179/1eA (notched) at 23° C. in parallel orientation to the flow of the composition for making the test specimen.

The impact strength is determined by measuring the Izod impact strength at 23° C. according to ISO 180 4A at 23° C. in parallel orientation and perpendicular orientation to the flow of the composition for making the test specimen.

The results are summarized in Table 1 and 2. II indicates parallel and L indicates perpendicular in respective measurements.

TABLE 1

| | | Comp. A (no filler) | Comp. B (toilet-paper) | Ex. 1 (high filler) | Ex. 2 (low filler) |
|---|---|---|---|---|---|
| fiber content | wt % | 0 | 10.9 | 10.9 | 9.45 |
| Density | kg/m3 | 907.1 | 956 | 960.1 | 947 |
| Tensile modulus | N/mm2 | 1657.1 | 2283.7 | 2714.2 | 2558 |
| Tensile Strength | N/mm2 | 36.7 | 41.8 | 49.1 | 45 |
| Flexural Modulus II | N/mm2 | 1826 | 2456 | 2622 | 2449 |
| Flexural Strength II | N/mm2 | 57.9 | 67.4 | 72.3 | 67.5 |
| Flexural Modulus L | N/mm2 | 1846 | 2306 | 2390 | 2241 |
| Flexural Strength L | N/mm2 | 58.2 | 63.9 | 67.5 | 62.7 |
| Charpy unnotched 23° C. II | kJ/m2 | 75.77 | 27.6 | 28 | 27.63 |
| Charpy notched 23° C. II | kJ/m2 | 2.58 | 2.9 | 3.2 | 3.62 |
| Izod notched 23° C. II | kJ/m2 | 1.68 | 1.94 | 2.16 | 1.96 |
| Izod notched 23° C. L | kJ/m2 | 1.65 | 1.92 | 2.17 | 1.88 |

TABLE 2

| | | Comp. C (low talc) | Comp. D (medium talc) | Comp. E (high talc) |
|---|---|---|---|---|
| filler content | wt % | 9.92 | 19.67 | 29.8 |
| Density | kg/m3 | 972.1 | 1023.2 | 1134 |
| Tensile Modulus | N/mm2 | 2219.8 | 2662.8 | 3366.6 |
| Tensile Strength | N/mm2 | 35.2 | 33.7 | 32.6 |
| Flexural Modulus (II) | N/mm2 | 2380 | 2933 | 3418 |
| Flexural Strength (II) | N/mm2 | 61.5 | 63.4 | 62 |
| Flexural Modulus (L) | N/mm2 | 2383 | 2795 | 3305 |
| Flexural Strength (L) | N/mm2 | 61.7 | 61.8 | 60.7 |
| Charpy unnotched 23° C. II | kJ/m2 | 46.63 | 34.38 | 24.83 |
| Charpy notched 23° C. II | kJ/m2 | 2.61 | 2.17 | 2.19 |
| Izod notched 23° C. II | kJ/m2 | 1.74 | 1.74 | 1.61 |
| Izod notched 23° C. L | kJ/m2 | 1.79 | 1.84 | 1.38 |

The density comparison shows that the examples according to the invention have a lower density compared to comparative experiments C-E in which talc is used as fillers.

For similar amounts of the filler, the tensile modulus comparison shows that the examples according to the invention show a remarkably higher tensile modulus compared to comparative experiments B comprising a paper product not comprising a thermoplastic polymer and comparative experiments C-E in which talc is used as fillers. A higher tensile modulus is observed for a higher paper product content.

For similar amounts of the filler, the tensile strength comparison shows that the examples according to the invention show a remarkably higher tensile strength compared to comparative experiments B comprising a paper product not comprising a thermoplastic polymer and comparative experiments C-E in which talc is used as fillers. A higher tensile strength is observed for a higher paper product content, whereas a lower tensile strength is observed for a higher talc content.

For similar amounts of the filler, the flexural modulus is comparable between the examples and the comparative experiments.

For similar amounts of the filler, the flexural strength comparison shows that the examples according to the invention show a higher flexural strength compared to comparative experiments B comprising a paper product not comprising a thermoplastic polymer and comparative experiments C-E in which talc is used as fillers. A higher flexural strength is observed for a higher paper product content.

For similar amounts of the filler, the Charpy impact strength (unnotched) comparison shows that the examples according to the invention show a similar flexural strength compared to comparative experiments B comprising a paper product not comprising a thermoplastic polymer. The Charpy impact strength (notched) is higher for the examples according to the invention compared to comparative experiments.

The Izod notched impact strength comparison shows little difference between the experiments.

It can therefore be concluded that the examples according to the invention show better mechanical properties at lower density than the comparative experiments. In particular, a filler of a paper product comprising a mixture of cellulose fibers and a thermoplastic polymer were found to show better mechanical properties compared to a filler of a paper product not comprising a thermoplastic polymer. It is particularly notable that the examples according to the invention show a high tensile modulus or a high tensile strength at a low density.

The invention claimed is:

1. A process for making a thermoplastic composition, comprising:
   melt mixing a first thermoplastic polymer and a paper product comprising a mixture of cellulose fibers and a second thermoplastic polymer, wherein the paper product is an industrial waste from a process for making a coffee pad or a tea bag.

2. The process according to claim 1, wherein the paper product has a porous structure of the cellulose fibers wherein the second thermoplastic polymer partly or wholly covers the cellulose fibers.

3. The process according to claim 1, wherein the paper product is obtained by a process comprising i) providing a mixture of the cellulose fibers and a melt of the second thermoplastic polymer and ii) cooling the mixture to a temperature below the melting point of the second thermoplastic polymer.

4. The process according to claim 3, wherein step i) involves dry blending the cellulose fibers and the second thermoplastic polymer and melting the second thermoplastic polymer optionally while mixing.

5. The process according to claim 4, wherein the second thermoplastic polymer to be dry blended with the cellulose fibers is in the form of fibers.

6. The process according to claim 1, wherein the paper product has a porous structure of the cellulose fibers and fibers of the second thermoplastic polymer.

7. The process according to claim 1, wherein the first thermoplastic polymer is polyolefin and the second thermoplastic polymer is polyolefin.

8. The process according to claim 1, wherein the amount of the cellulose fibers in the thermoplastic composition is 1-50 wt % of the total composition.

9. The process according to claim 1, wherein the melt mixing involves melting the first thermoplastic polymer in the extruder and feeding the paper product to the melted first thermoplastic polymer in the form of a paper.

10. A thermoplastic polymer composition obtained by the process according to claim 1.

11. A moulded article comprising the thermoplastic composition according to claim 9.

12. The process according to claim 8, wherein the paper product comprises 50-99 wt % of the cellulose fibers and 1-50 wt % of the second thermoplastic polymer with respect to the total of the paper product.

13. The process according to claim 6, wherein the first thermoplastic polymer is different from the second thermoplastic polymer.

14. The process according to claim 9, comprising no pretreatment of the paper prior to feeding the paper to the extruder.

15. The process according to claim 9, wherein the paper is a roll of paper fed to the extruder.

* * * * *